United States Patent Office 2,721,220
Patented Oct. 18, 1955

2,721,220

(2-BENZOYLVINYL)TRIMETHYL-AMMONIUM SALTS

Chester J. Cavallito, Decatur, Ill., assignor to Sterling Drug Inc., New York, N. Y., a corporation of Delaware No Drawing. Application April 13, 1953,
Serial No. 348,575

4 Claims. (Cl. 260—567.6)

This invention relates to new chemical compounds, namely, (2-benzoylvinyl)trimethylammonium salts, and to their preparation. These compounds have the chemical structure

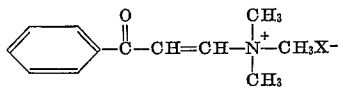

wherein X is an anion.

The (2-benzoylvinyl)trimethylammonium salts of my invention possess pharmacological activity, and in particular exhibit a nicotine-like stimulation. They are useful as respiratory analeptics.

My new compounds are prepared by bringing together phenyl ethynyl ketone and a trimethylamine acid-addition salt in an inert solvent in the presence of a small amount of free trimethylamine, whereupon the (2-benzoylvinyl)-trimethylammonium salt is directly formed.

The nature of the anion X is not critical, provided it is essentially non-toxic to the animal organism, since the desirable physiological properties reside entirely within the cation portion of the molecule. Those anions which are therapeutically acceptable are well-known to the chemist and biologist, and include such ions as chloride, bromide, iodide, nitrate, sulfate, bisulfate, phosphate, acetate, citrate, lactate, benzenesulfonate and the like. The invention thus contemplates such salts as (2-benzoylvinyl)trimethylammonium chloride, (2-benzoylvinyl)trimethylammonium bromide, (2-benzoylvinyl)trimethylammonium iodide, (2-benzoylvinyl)trimethylammonium nitrate, (2-benzoylvinyl)trimethylammonium sulfate, (2-benzoylvinyl(trimethylammonium bisulfate, (2-benzoylvinyl)trimethylammonium phosphate, (2-benzoylvinyl)-trimethylammonium acetate, (2-benzoylvinyl)trimethylammonium citrate, (2-benzoylvinyl)trimethylammonium lactate, (2-benzoylvinyl)trimethylammonium benzenesulfonate and the like, prepared by causing phenyl ethynyl ketone to react respectively with trimethylamine hydrochloride, trimethylamine hydrobromide, trimethylamine hydriodide, etc. If the anion X is one derived from a weak acid, such as the acetate, cirtrate or lactate, the (2-benzoylvinyl)trimethylammonium salt can most conveniently be prepared from a (2-benzoylvinyl)trimethylammonium halide (X in the above structural formula is chlorine, bromine or iodine). This procedure is carried out by treating the (2-benzoylvinyl)trimethylammonium halide with silver oxide which produces the corresponding quaternary ammonium hydroxide, the halide ions being removed in the form of silver halide. The quaternary ammonium hydroxide can then be converted to any desired salt by neutralization with the appropriate acid. For example, an aqueous solution of (2-benzoylvinyl)trimethylammonium chloride with silver oxide gives a solution containing (2-benzoylvinyl)trimethylammonium hydroxide, and silver chloride is precipitated. The filtered solution can then be neutralized with, for example, acetic acid, and the solution evaporated to give (2-benzoylvinyl)trimethylammonium acetate.

Example

To a solution of 38.4 g. (0.4 mole) of trimethylamine hydrochloride in 200 ml. of 95% ethanol was added enough trimethylamine to make the solution alkaline. With cooling and shaking, 52 g. (0.4 mole) of phenyl ethynyl ketone was added. The solution was kept at 25–30° C., and within a few minutes crystals began to separate. After thirty minutes, the solution was diluted with an equal volume of ether to complete precipitation of the product. The product was collected by filtration, giving 72.5 g. of (2-benzoylvinyl)trimethylammonium chloride. When recrystallized from ethanol, a sample was obtained melting at 159° C. with decomposition.

*Analysis.*—Calcd. for $C_{12}H_{16}ONCl$: C, 63.85; H, 7.15; Cl, 15.70. Found: C, 64.16; H, 6.87; Cl, 15.57.

The ultraviolet absorption spectrum of (2-benzoylvinyl)trimethylammonium chloride showed a maximum, $E=7700$ at 268 m$\mu$ and a minimum, $E=3200$ at 242 m$\mu$.

(2 - benzoylvinyl)trimethylammonium chloride was found to possess intense parasympathetic ganglionic stimulation in the dog at a dose of 0.2 mg. per kg. of body weight.

I claim:

1. A (2-benzoylvinyl)trimethylammonium salt having the formula

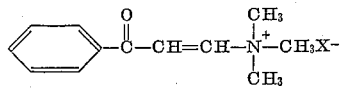

where X is an anion, said anion being non-toxic to the animal organism.

2. 2-(benzoylvinyl)trimethylammonium chloride having the formula

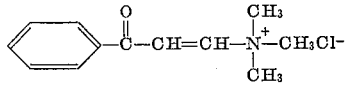

3. The process for preparing a (2-benzoylvinyl)trimethylammonium salt which comprises treating phenyl ethynyl ketone with a trimethylamine acid-addition salt, the anion of which is non-toxic to the animal organism, in an inert solvent and in the presence of free trimethylamine.

4. The process for preparing (2-benzoylvinyl)trimethylammonium chloride which comprises treating phenyl ethynyl ketone with trimethylamine hydrochloride in an inert solvent and in the presence of free trimethylamine.

References Cited in the file of this patent

Bowden et al.: J. Chem. Soc., 1946, 945–948.